(12) United States Patent
Krishnan et al.

(10) Patent No.: US 11,099,039 B2
(45) Date of Patent: Aug. 24, 2021

(54) SENSOR ASSEMBLY

(71) Applicant: Ford Global Technologies, LLC, Dearborn, MI (US)

(72) Inventors: Venkatesh Krishnan, Canton, MI (US); Rashaun Phinisee, Ypsilanti Township, MI (US); Manan Sevak, Southfield, MI (US); James Pizzimenti, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 16/553,597

(22) Filed: Aug. 28, 2019

(65) Prior Publication Data

US 2021/0063210 A1    Mar. 4, 2021

(51) Int. Cl.
| | |
|---|---|
| *G01D 11/24* | (2006.01) |
| *G01D 11/26* | (2006.01) |
| *G01L 19/14* | (2006.01) |
| *G01D 11/30* | (2006.01) |
| *G01S 7/02* | (2006.01) |
| *H04N 5/225* | (2006.01) |
| *G01S 7/481* | (2006.01) |

(52) U.S. Cl.
CPC .......... *G01D 11/245* (2013.01); *G01D 11/26* (2013.01); *G01D 11/30* (2013.01); *G01L 19/14* (2013.01); *G01S 7/02* (2013.01); *G01S 7/027* (2021.05); *G01S 7/4813* (2013.01); *H04N 5/2252* (2013.01)

(58) Field of Classification Search
CPC ...... G01D 11/24; G01D 11/245; G01D 11/30; G01D 11/26; G01L 19/14
USPC ............................................................ 73/431
See application file for complete search history.

(56) References Cited

U.S. PATENT DOCUMENTS

| | | |
|---|---|---|
| 10,150,432 B2 | 12/2018 | Dry et al. |
| 2014/0104426 A1 | 4/2014 | Boegel et al. |
| 2016/0096486 A1 | 4/2016 | Dziurda et al. |
| 2017/0305242 A1 | 10/2017 | Gallagher et al. |
| 2018/0015886 A1 | 1/2018 | Frank et al. |
| 2018/0017680 A1 | 1/2018 | Pennecot et al. |
| 2018/0122239 A1 | 5/2018 | Czyz et al. |

FOREIGN PATENT DOCUMENTS

| | | |
|---|---|---|
| CN | 107826032 A | 3/2018 |
| CN | 207449761 U | 6/2018 |

*Primary Examiner* — Clayton E. LaBalle
*Assistant Examiner* — Kevin C Butler
(74) *Attorney, Agent, or Firm* — Frank A. MacKenzie; Bejin Bieneman PLC (57) ABSTRACT

An assembly includes a base having an inlet and an outlet. The assembly includes a deflector supported by the base rearward of the inlet. The assembly includes a sensor supported by the base and in fluid communication with the outlet. The base defines a channel extending between a first end and a second end, the inlet at the first end and the deflector at the second end. The outlet is forward of the deflector and outside the channel.

18 Claims, 6 Drawing Sheets

SENSOR ASSEMBLY

BACKGROUND

A vehicle may operate in an autonomous mode, a semiautonomous mode, or a nonautonomous mode. In the autonomous mode each of a propulsion system, a braking system, and a steering system of the vehicle are controlled by a computer of the vehicle. In a semiautonomous mode the computer controls one or two of the propulsion, braking, and steering systems. In a nonautonomous mode, a human operator controls the propulsion, braking, and steering systems. The computer may control the propulsion, braking, and/or steering systems based on data from one or more sensors.

The sensors detect the external world and generate data, e.g., transmittable via a communication bus or the like to the computer. The sensors may be, for example, radar sensors, scanning laser range finders, light detection and ranging (LIDAR) devices, and image processing sensors such as cameras.

DETAILED DESCRIPTION

An assembly includes a base having an inlet and an outlet. The assembly includes a deflector supported by the base rearward of the inlet. The assembly includes a sensor supported by the base and in fluid communication with the outlet. The base defines a channel extending between a first end and a second end, the inlet at the first end and the deflector at the second end. The outlet is forward of the deflector and outside the channel.

The deflector may be removable from the base.

The base may include an exhaust at the second end of the channel.

The assembly may include a housing supported by the base and having a vent in fluid communication with the outlet.

The sensor may be between the outlet and the vent.

The housing may include an outer shell and a support ring inside the outer shell, the sensor supported by the support ring.

The vent may face the sensor.

The assembly may include blower supported by the base and in fluid communication with the outlet.

The assembly may include a seal extending about a perimeter of the base.

The base may include a leg, the channel defined by the leg.

The assembly may include a housing supported by the base, the housing having a bottom extending beyond a top of the base.

The bottom of the housing may define a drain hole spaced from the base.

The base may define a chamber having a rear opening, the outlet in the chamber.

A vehicle includes a body panel. The vehicle includes a base supported by the body panel having an inlet and an outlet, the inlet facing a vehicle-forward direction. The vehicle includes a deflector supported by the base rearward of the inlet. The vehicle includes a sensor supported by the base and in fluid communication with the outlet. The base and the body panel define a channel extending from the inlet to the deflector. The outlet is forward of the deflector and outside the channel.

The vehicle may include a seal abutting the body panel and defining the channel.

The base may include an exhaust at a rear of the base.

The exhaust may be defined by the body panel and the base.

The vehicle may include a housing supported by the base and having a vent in fluid communication with the outlet, the vent facing away from the vehicle-forward direction.

The inlet may be spaced from the body panel.

With reference to the Figures, wherein like numerals indicate like parts throughout the several views, an assembly 20 for a vehicle 22 includes a base 24 having an inlet 26 and an outlet 28 (shown in FIGS. 3-6). The assembly 20 includes a deflector 30 supported by the base 24 rearward of the inlet 26. The assembly 20 includes at least one sensor 32 supported by the base 24 and in fluid communication with the outlet 28. The base 24 defines a channel 34 extending between a first end 36 and a second end 38, the inlet 26 at the first end 36 and the deflector 30 at the second end 38. The outlet 28 is forward of the deflector 30 and outside the channel 34.

The assembly 20 supports sensors 32 and separates liquid L from a mixture of liquid L and air A that enters the inlet 26. For example, an air A and liquid L mixture may enter the inlet 26 when the vehicle 22 is traveling in a forward direction D. The air A and liquid L mixture may flow through the channel 34 and into the deflector 30. Impact of the mixture with the deflector 30 may separate liquid L from the air A. A portion of the air A may flow through the outlet 28 and provide cooling air flow to the sensors 32. A portion of the air A may flow out an exhaust 80. Gravity and air A flow out of the exhaust 80 may urge the separated liquid L to flow down the deflector 30 and out of the exhaust 80.

Figure 1:
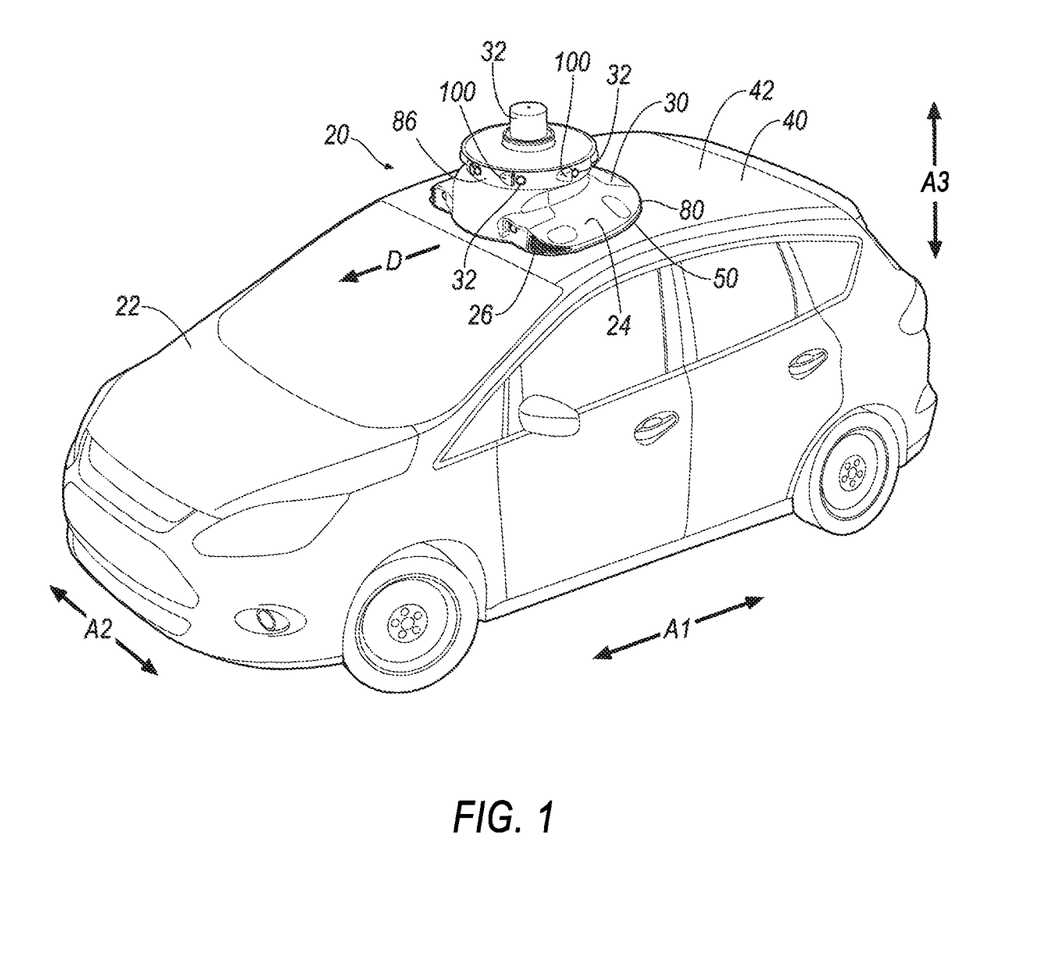
FIG. 1 is a perspective view of a vehicle having a sensor assembly.
Figure 2:
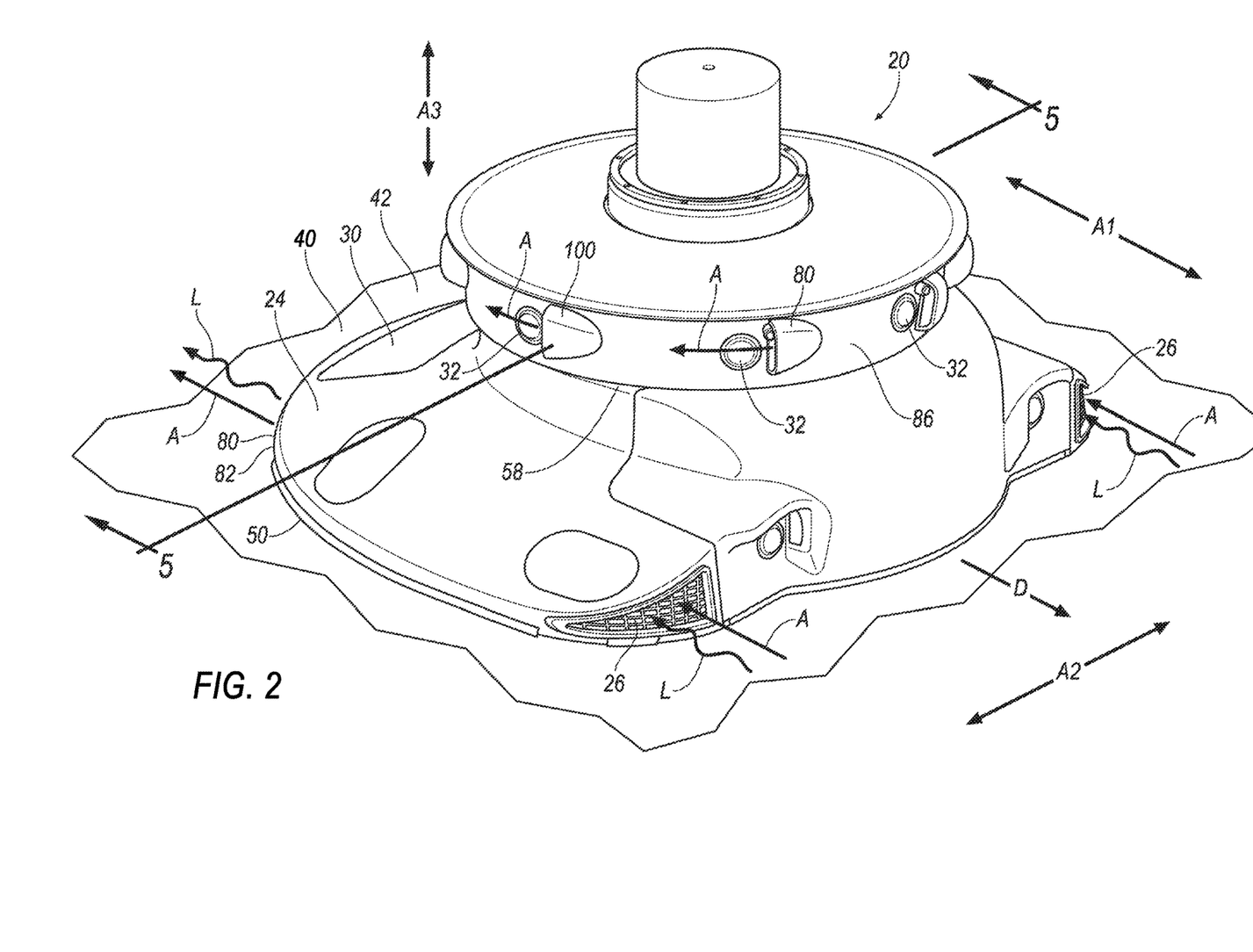
FIG. 2 is a perspective view of the sensor assembly.

The vehicle 22 may be any type of passenger or commercial vehicle such as a car, a truck, a sport utility vehicle, a crossover vehicle, a van, a minivan, a taxi, a bus, etc. The vehicle 22 may include a passenger cabin to house occupants, if any, of the vehicle 22. The vehicle 22 may include one or more body panels 40. The body panels 40 surround a passenger compartment and other components of the vehicle 22. The body panels 40 provide external surfaces of the vehicle 22 and may have a class-A surface, i.e., a surface specifically manufactured to have a high quality, finished aesthetic appearance free of blemishes. One or more body panels 40 may be at a roof 42 of the vehicle 22, e.g., above the passenger cabin.

The vehicle 22 defines a longitudinal axis A1, e.g., extending between a front and a rear of the vehicle 22. The vehicle 22 defines a cross-vehicle axis A2, e.g., extending between a right side and a left side of the vehicle 22. The vehicle 22 defines a vertical axis A3, e.g., extending between a top and a bottom of the vehicle 22. The longitudinal axis A1, the cross-vehicle axis A2, and the vertical axis A3 are perpendicular to each other.

The vehicle 22 may operate in an autonomous mode, a semiautonomous mode, or a nonautonomous mode. For purposes of this disclosure, an autonomous mode is defined as one in which each of a propulsion system, a braking system, and a steering system of the vehicle 22 are controlled by a computer of the vehicle 22. In a semiautonomous mode the computer controls one or two of the propulsion, braking, and steering systems. In a nonautonomous mode, a human operator controls the propulsion, braking, and steering systems. The computer may control the propulsion, braking, and/or steering systems based on data from one or more sensors 32.

The base 24 supports the other components of the assembly 20, e.g., the sensors 32, a blower 44, etc. The base 24 may include an inner tray 46, shown, for example, in FIGS. 5 and 6. The base 24 may include an outer tray 48 above the inner tray 46. The outer tray 48 may be fixed to the inner tray 46, e.g., via fastener, adhesive, friction welding, etc. For example, the inner tray 46 and the outer tray 48 may be fused together, e.g., via welding, friction welding, adhesive, etc., at a perimeter 50 of the base 24.

The perimeter 50 may be at a bottom of the base 24. The base 24 includes a top 58. An outer surface 60 of the base 24 may extend downward from the top 58 to the perimeter 50, e.g., relative to the vertical axis A3. The outer surface 60 of the base 24 may extend outward from the top 58 to the perimeter 50, e.g., relative to a center of the base 24, the longitudinal axis A1, and the cross-vehicle axis A2. The outer surface 60 may be defined by the outer tray 48.

The base 24 may include one or more legs 54. The assembly 20 may be supported by the vehicle 22 via the legs 54, as further described below. The legs 54 may extend away from the top 58. For example, the legs 54 may extend downward from first ends 62 at an upper portion 52 of the inner tray 46 to second ends 64 spaced from the upper portion 52. The upper portion 52 is above other components of the base 24, e.g., the perimeter 50, legs 54, a center portion 56, etc. The legs 54 may be elongated generally along the longitudinal axis A1, e.g., between the front the rear of the vehicle 22. The legs 54 may be fixed to the roof 42, one of the body panels, 40, etc., e.g., with a fastener or the like.

Figure 5:
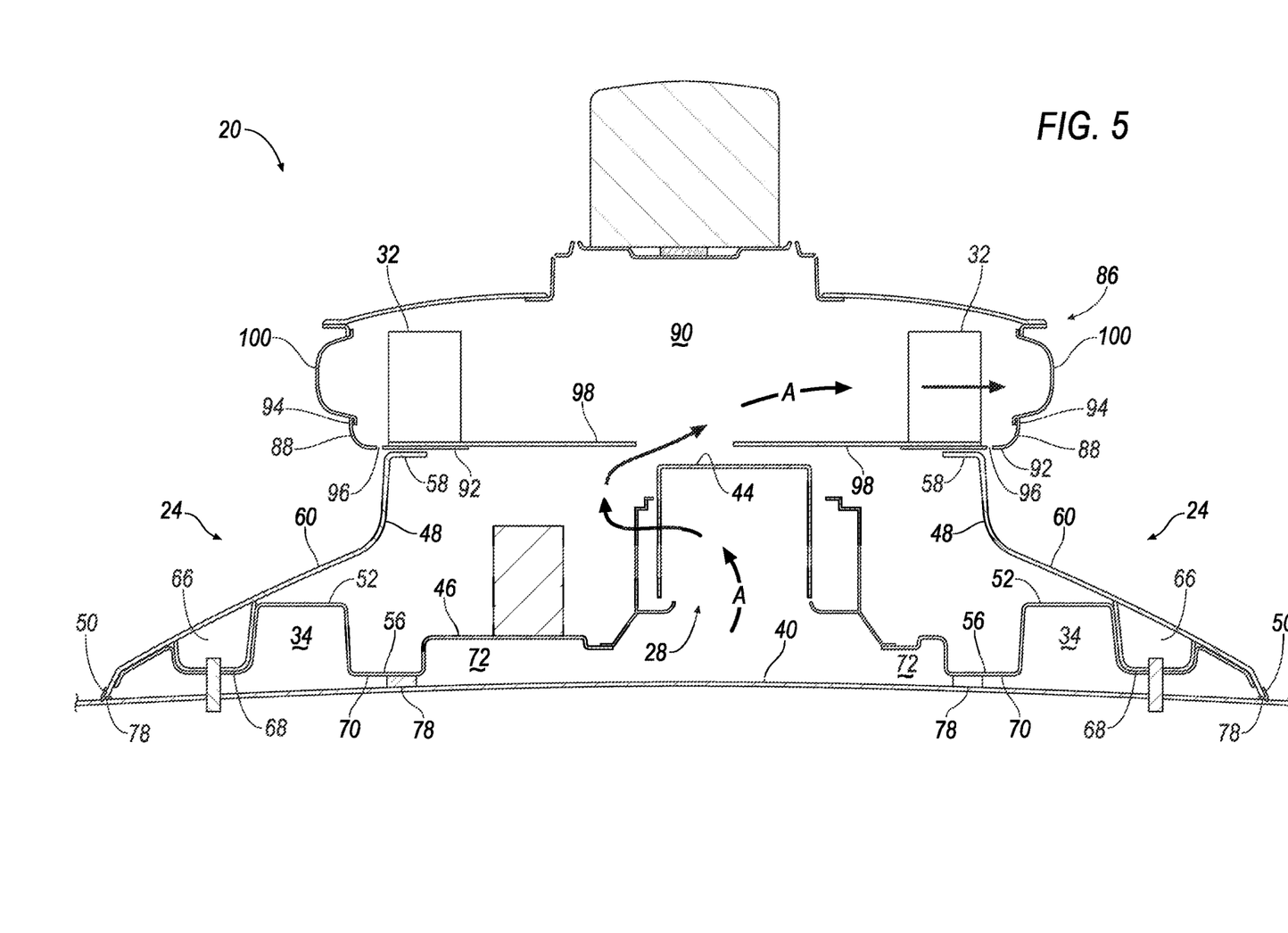
FIG. 5 is a cross section of the sensor assembly taken at a line 5-5 illustrated in FIG. 2.
Figure 6:
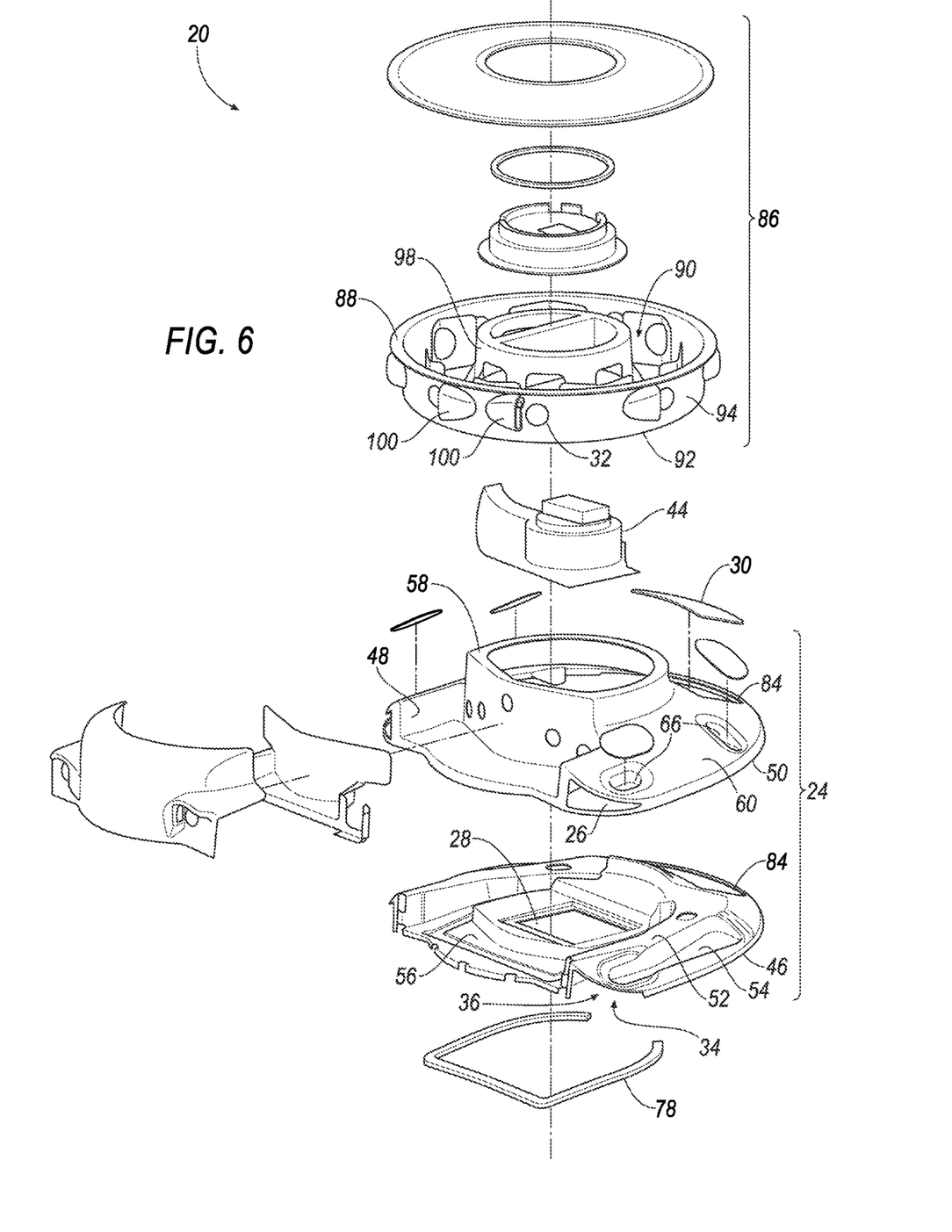
FIG. 6 is an exploded view of the sensor assembly.

The base 24 may include one or more second legs 66, illustrated in FIGS. 5 and 6. The second legs 66 may be in the legs 54. The second legs 66 may extend downward from the outer surface 60 to distal ends 68. The distal ends 68 of the second legs 66 may abut the second ends 64 of the of the legs 54.

The center portion 56 of the base 24, illustrated in FIGS. 3-6, extends away from the top 58. The center portion 56 may extend downward from the upper portion 52 of the inner tray 46. The center portion 56 may include a bottom 70. The bottom 70 may be horseshoe shaped.

The center portion 56 defines a chamber 72. The chamber 72 may be enclosed along a front and side of the chamber 72 by the center portion 56. The chamber 72 may be enclosed along a bottom of the chamber 72 by the body panel 40. The chamber 72 may be enclosed along a top by the upper portion 52.

Figure 3:
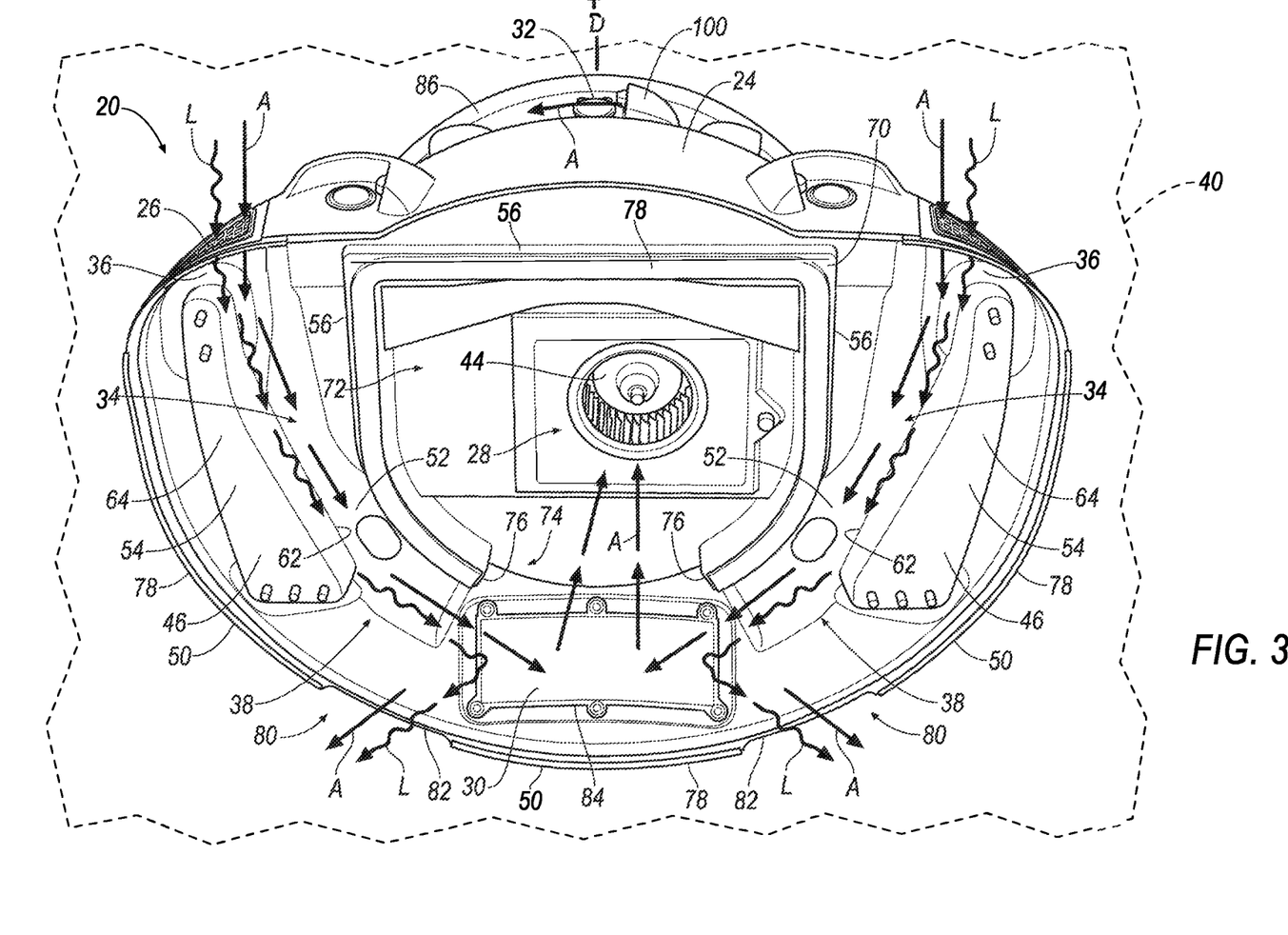
FIG. 3 is another perspective view of the sensor assembly.
Figure 4:
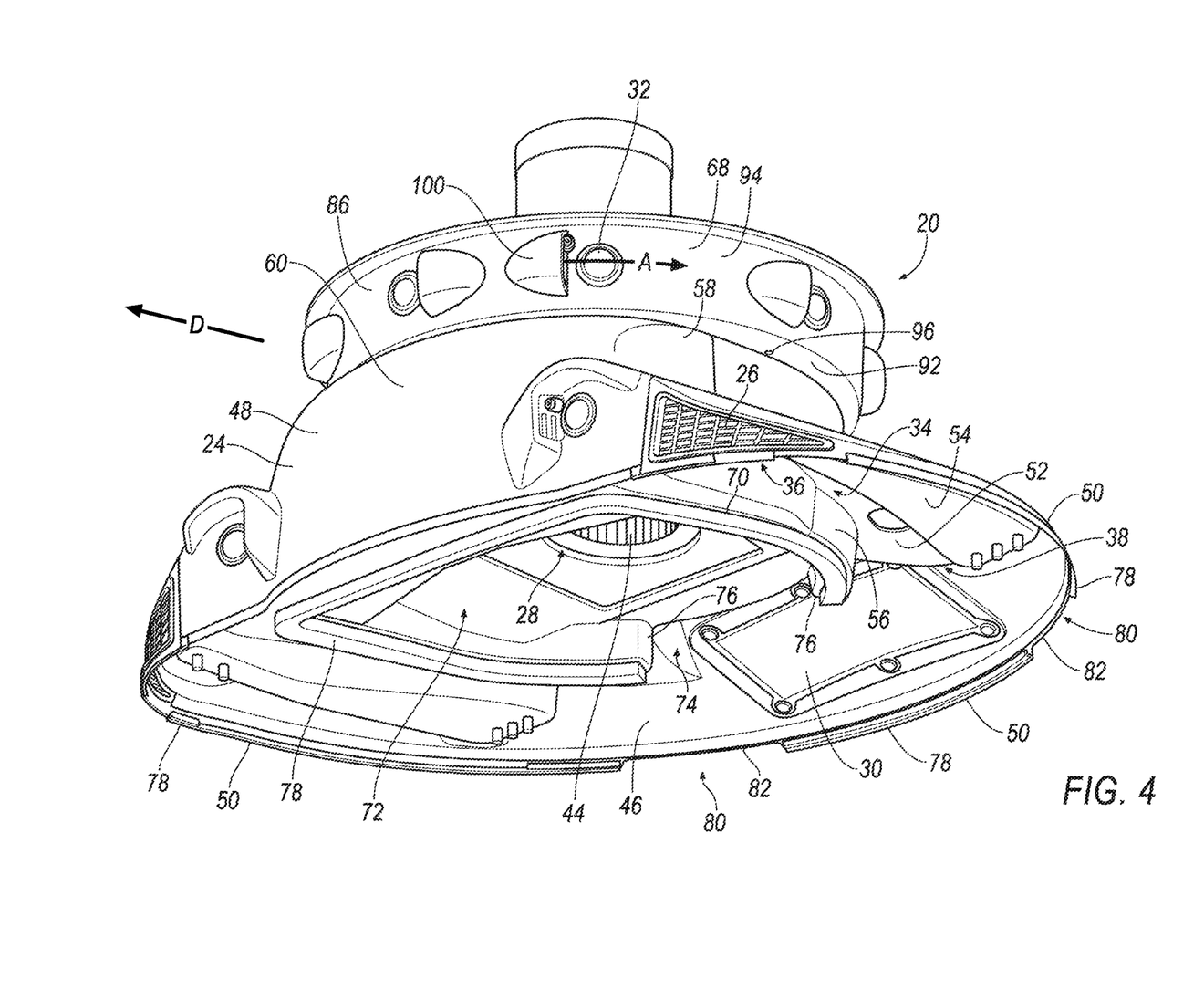
FIG. 4 is another perspective view of the sensor assembly.

The center portion 56 may define an opening 74, illustrated in FIGS. 3 and 4, at a rear of the chamber 72. The opening 74 provides fluid communication between the deflector 30 and the chamber 72. The opening 74 may be between ends 76 of the horseshoe shape of the center portion 56.

The channel 34, illustrated in FIGS. 3-6, directs fluid. For example, the channel 34 may direct air A and liquid L from the inlet 26 to the deflector 30. The liquid L is entrained in the air A and may be, for example, airborne precipitation, road splash, condensation, etc. The base 24 defines the channel 34, e.g., between the leg 54, the upper portion 52, and the center portion 56. For example, the leg 54 and the center portion 56 may extend along sides of the channel 34, and the upper portion 52 of the base 24 may extend along a top of the channel 34. The body panel 40 may further define the channel 34, e.g. extending along a bottom of the channel 34.

The channel 34 extends between the first end 36 and the second end 38. The first end 36 may be at the front of the base 24, i.e., closer to the front than the rear. The second end 38 may be at the rear of the base 24. The channel 34 may be open at the first end 36 and the second end 38, e.g., permitting fluid to enter and exit the channel 34. The inlet 26 may be at the first end 36 and the deflector 30 may be at the second end 38. In other words, the channel 34 may extend from the inlet 26 to the deflector 30.

The assembly 20 may include one or more seals 78 for preventing fluid flow between the base 24 and the body panel 40. For example, one or more seals 78 may extend about the perimeter 50 of the base 24, e.g., abutting the perimeter 50 and the body panel 40. As another example, one or more seals 78 may extend about the center portion 56, e.g., abutting the center portion 56 and the body panel 40. The seals 78 may be rubber, closed cell foam, or any suitable material. The seals 78 may further define the channel 34 and the chamber 72.

The inlet 26 enables fluid flow from outside the assembly 20 to the channel 34. The inlet 26 may include an opening at the front of the outer tray 48. The inlet 26 faces a vehicle-forward direction D relative to the longitudinal axis A1, e.g., such that air is urged into the inlet 26 as the vehicle 22 travels in the vehicle-forward direction D. The inlet 26 is spaced from body panel 40. For example, the perimeter 50 of the base 24 and the seal 78 may extend under the inlet 26, e.g., between the body panel 40 and the inlet 26. Spacing the inlet 26 from the body panel 40 restricts liquid from entering the inlet 26, e.g., by preventing liquid from flowing along the body panel 40 and into the inlet 26.

The outlet 28 enables air flow from chamber 72 to the sensor 32. The outlet 28 may include an opening defined by the inner tray 46. The outlet 28 may be forward of the deflector 30. For example, the opening 74 at the rear of the center portion 56 may be between the deflector 30 and the outlet 28. The outlet 28 may be outside the channel 34. For example, the outlet 28 may be in the chamber 72 defined by the center portion 56.

The base 24 may include the exhaust 80, illustrated in FIGS. 3 and 5. The exhaust 80 permits air and liquid to exit the assembly 20. The exhaust 80 may be at the second end 38 of the channel 34. The exhaust 80 may be at the rear of the assembly 20, e.g., relative to the longitudinal axis A1. For example, a portion 82 of the perimeter 50 may be elevated relative to the perimeter 50 adjacent such portion 82. The elevated portion 82 may be spaced from the body panel 40 when the assembly 20 is supported by the vehicle 22, i.e., defining an opening therebetween.

The deflector 30 redirects air A, e.g., from the second end 38 of the channel 34 to the outlet 28. The deflector 30 may separate liquid L from the air A. For example, liquid L from a liquid L and air A mix may be separated from the air A when the mix A, L impacts the deflector 30. After striking the deflector 30, the air A may flow to the exhaust 80 and the outlet 28, and liquid L may flow, e.g., down the deflector 30 to the body panel 40, out of the exhaust 80. The deflector 30 may be a generally planar panel that is rectangular in shape. The deflector 30 may be plastic, metal, or any suitable solid material. For example, the deflector 30 and the base 24 be be a same material.

The deflector 30 may be supported by the base 24 rearward of the inlet 26, e.g., at the second end 38 of the channel 34. The deflector 30 may extend downward and rearward from the top 58 of the base 24. The deflector 30 may be removable from the base 24. For example, the inner tray 46 and the outer tray 48 may define openings 84 aligned with each other and at the rear of the base 24. The deflector 30 may be releasably fixed to the base 24 covering the openings 84, e.g., via thread fastener or the like. Removing the deflector 30 may provide access, e.g., to the chamber 72 defined by the center portion 56, the second ends 38 of the channels 34, etc. The deflector 30 may be reattached after removal. In other words, removable from the base 24 means the deflector 30 may be removed and reinstalled without damaging the base 24 or deflector 30. Alternately, the deflector 30 may be irremovably fixed to the based, e.g., via welding, etc. As used herein, irremovably fixed means being secured such that the deflector 30 is unable to be detached from the base 24 without the deforming or otherwise damaging the base 24 and/or the deflector 30. For example, the base 24 and the deflector 30 may be monolithic, i.e., a one-piece unit without any fasteners, joints, welding, adhesives, etc., fixing the base 24 and the deflector 30 to each other.

The assembly 20 may include a housing 86 that houses and supports one or more sensors 32. The housing 86 may be supported by the base 24. For example, the housing 86 may be fixed to the top 58 of the base 24, e.g., via fastener, friction fit, etc.

The housing 86 may include an outer shell 88. The outer shell 88 may enclose a chamber 90. For example, the outer shell 88 of the housing 86 may include a bottom 92 and sidewalls 94 defining the chamber 90.

The bottom 92 of the housing 86 may extend beyond the top 58 of the base 24, e.g., along the longitudinal axis A1 and/or cross-vehicle axis A3. For example, the bottom 92 of the housing 86 may be wider than the top 58 of the base 24.

The bottom 92 of the housing 86 may define a drain hole 96, illustrated in FIGS. 4 and 5. The drain hole 96 permits liquid to egress from the chamber 90 of the housing 86, e.g., urged by gravity. The drain hole 96 is spaced from the base 24, e.g., along the cross-vehicle axis A3 and/or longitudinal axis A1. For example, the drain hole 96 may be outboard of the top 58 of the base 24. Liquid exiting the drain hole 96 may land on the outer surface 60 of the base 24 and be urged by gravity to flow along the outer surface 60 and off the assembly 20, e.g., onto the body panel 40.

The housing 86 may include a support ring 98. The support ring 98 supports one or more sensors 32. The support ring 98 is inside the outer shell 88, i.e., in the chamber 90 defined by the outer shell 88. The support ring 98 may be supported by the outer shell 88. For example, the support ring 98 may be fixed outer shell 88 via fastener, adhesive, etc. As another example, the outer shell 88 and the support ring 98 may be monolithic.

The housing 86 may have one or more vents 100 in fluid communication with the outlet 28, e.g., such that air from the outlet 28 may flow to the vents 100. For example, air from the chamber 83 defined by the center portion 56 may flow through the outlet 28 to the chamber 90 defined by the outer shell 88 of the housing 86, and then out of the vents 100.

The vents 100 face the sensors 32, i.e., such that air from the vents 100 flow across field of views of the respective sensors 32. Air from the vents 100 may maintain a clear field of view of the sensor 32, e.g., by limiting an amount of debris that contacts a lens in front of the respective sensors 32 and/or by removing debris from such lens. The vent 100 facing away from the vehicle-forward direction D. For example, the vent 100 may face the right side, the left side, and/or the rear of the vehicle 22. The facing direction of the vent 100 is the direction in which air A is directed by the vent 100.

The sensors 32 detect the external world and generate data, e.g., transmittable via a communication bus or the like to the computer of the vehicle 22. The sensors 32 may be, for example, radar sensors 32, scanning laser range finders, light detection and ranging (LIDAR) devices, and image processing sensors such as cameras. The field of view of each sensor 32 is a volume relative to, and detectable, by such sensor 32. The volume may be defined by azimuth and altitude angle ranges, as well as by a depth, or detection distance.

The sensors 32 may be supported by the base 24 and in fluid communication with the outlet 28, i.e., such that air from the outlet 28 may flow to the sensors 32. Air flow to the sensors 32 may maintain temperature of the sensors 32, e.g., by reducing temperature of the sensors 32. For example, the sensors 32 may be between the outlet 28 and the vents 100 such that air flows from the outlet 28, across the sensors 32, and out of the vents 100. The sensor 32 supported by the support ring 98, e.g., fixed to the support ring 98.

The assembly 20 may include the blower 44. The blower 44 pumps air, e.g., by generating lower air pressure at an intake of the blower 44 relative to higher air pressure at an exhaust of the blower 44. The blower 44 may include a motor operatively coupled to a fan. The blower 44 may be supported by the base 24. For example, the blower 44 may be fixed to the inner tray 46 of the assembly 20. The blower 44 may be in fluid communication with the outlet 28, i.e., such that air A from the outlet 28 may flow to the blower 44. For example, the intake of the blower 44 may be operatively coupled to the outlet 28 to draw air A from the chamber 72 defined by the center portion 56 through the outlet 28. The blower 44 may be in fluid communication with the housing 86, i.e., such that air A may flow from the blower 44 to the housing 86. For example, the exhaust 80 of the blower 44 may output air A into the chamber 90 defined by the outer shell 88 of the housing 86.

During normal operation of the vehicle 22 air A and liquid L entrained in the air A mix may flow in the inlet 26, e.g., via ram air effect from the vehicle 22 traveling forward. The air A and liquid L mix may flow from the inlet 26 to the first end 36 of the channel 34 and though the channel 34 to the second end 38 of the channel 34. The air A and liquid L mix may flow from the second end 38 into the deflector 30. The deflector 30 may separate the liquid L from the air A. The liquid L may flow out of the exhaust 80 of the assembly 20. The air A may flow into the chamber 72 defined by the center portion 56 and out of the exhaust 80 of the assembly 20. The blower 44 may draw air A from the chamber 72 defined by the center portion 56 through the outlet 28 and into the chamber 90 defined by the outer shell 88 of the housing 86. The air A in the housing 86 may flow across the sensors 32, out of the vents 100, and across the fields of view of the sensors 32.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a base having an inlet and an outlet;
a deflector supported by the base rearward of the inlet, the deflector removable from the base;
a sensor supported by the base and in fluid communication with the outlet;
the base defining a channel extending between a first end and a second end, the inlet at the first end and the deflector at the second end; and
the outlet forward of the deflector and outside the channel.

2. The assembly of claim 1, wherein the base includes an exhaust at the second end of the channel.

3. The assembly of claim 1, further comprising a housing supported by the base and having a vent in fluid communication with the outlet.

4. The assembly of claim 3, wherein the sensor is between the outlet and the vent.

5. The assembly of claim 3, wherein the housing includes an outer shell and a support ring inside the outer shell, the sensor supported by the support ring.

6. The assembly of claim 3, wherein the vent faces the sensor.

7. The assembly of claim 1, further comprising a blower supported by the base and in fluid communication with the outlet.

8. The assembly of claim 1, further comprising a seal extending about a perimeter of the base.

9. The assembly of claim 1, wherein the base includes a leg, the channel defined by the leg.

10. The assembly of claim 1, further comprising a housing supported by the base, the housing having a bottom extending beyond a top of the base.

11. The assembly of claim 10, wherein the bottom of the housing defines a drain hole spaced from the base.

12. The assembly of claim 1, wherein the base defines a chamber having a rear opening, the outlet in the chamber.

13. A vehicle, comprising:
a body panel;
a base supported by the body panel having an inlet and an outlet, the inlet facing a vehicle-forward direction;
a deflector supported by the base rearward of the inlet;
a sensor supported by the base and in fluid communication with the outlet;
the base and the body panel of the vehicle defining a channel extending from the inlet to the deflector; and
the outlet forward of the deflector and outside the channel.

14. The vehicle of claim 13, further comprising a seal abutting the body panel and defining the channel.

15. The vehicle of claim 13, wherein the base includes an exhaust at a rear of the base.

16. The vehicle of claim 15, wherein the exhaust is defined by the body panel and the base.

17. The vehicle of claim 13, further comprising a housing supported by the base and having a vent in fluid communication with the outlet, the vent facing away from the vehicle-forward direction.

18. The vehicle of claim 13, wherein the inlet is spaced from the body panel.

* * * * *